United States Patent [19]

Kanzaki

[11] Patent Number: 5,983,018
[45] Date of Patent: Nov. 9, 1999

[54] DEBUG INTERRUPT-HANDLING MICROCOMPUTER

[75] Inventor: Teruaki Kanzaki, Tokyo, Japan

[73] Assignee: Mitsubishi Denki Kabushiki Kaisha, Tokyo, Japan

[21] Appl. No.: 09/075,824

[22] Filed: May 12, 1998

[30] Foreign Application Priority Data

Jan. 9, 1998 [JP] Japan .................................. 10-003524

[51] Int. Cl.⁶ .............................. G06F 9/44; G06F 11/00
[52] U.S. Cl. .............................. 395/704; 714/38; 714/37; 714/34; 714/45; 712/227
[58] Field of Search .............................. 395/704, 500.47, 395/500.49, 500.44; 714/38, 37, 35, 34, 45, 47, 25, 726; 712/227, 220

[56] References Cited

U.S. PATENT DOCUMENTS

| 4,462,077 | 7/1984 | York .......................................... 714/45 |
| 4,598,364 | 7/1986 | Gum et al. ................................. 714/38 |
| 4,887,267 | 12/1989 | Kanuma .................................. 714/726 |
| 5,265,254 | 11/1993 | Blasciak et al. ......................... 395/704 |
| 5,345,580 | 9/1994 | Tamaru et al. ...................... 395/500.49 |
| 5,475,822 | 12/1995 | Sibgtroth et al. ......................... 712/228 |
| 5,560,036 | 9/1996 | Yoshida .................................. 712/227 |
| 5,761,482 | 6/1998 | Matsui et al. ...................... 395/500.44 |
| 5,901,283 | 5/1999 | Kanzaki .................................. 385/704 |
| 5,901,300 | 5/1999 | Funk et al. ............................. 712/200 |

FOREIGN PATENT DOCUMENTS

| 58-205226 | 11/1983 | Japan . |
| 62-95644 | 5/1987 | Japan . |
| 1-250143 | 10/1989 | Japan . |
| 5-77349 | 3/1993 | Japan . |

OTHER PUBLICATIONS

Youngsik et al., "Software abort and multiprocessor debugging," Proceedings of 1993 IEEE Region 10 Conference on Computer, Communication, Control and Power Engineering, TENCON '93, Oct. 19–21, 1993, vol. 1, pp. 237–241.

"Tailorable Embedded Event Trace," IBM Technical Disclosure Bulletin, vol. 34, No. 7B, Dec. 1991, pp. 259–261.

Doehle et al, "Comparator Logic to Assist Trace Facility For ROS Programs," IBM Technical Disclosure Bulletin, vol. 26, No. 3B, Aug. 1983, pp. 1566–1567.

Primary Examiner—Tariq R. Hafiz
Assistant Examiner—Than Q. Dam
Attorney, Agent, or Firm—Burns, Doane, Swecker & Mathis, LLP

[57] ABSTRACT

A microcomputer for checking a flag in a flag circuit to determine whether or not to decrement a count of a program counter. If the flag indicates execution of a STOP instruction, the program counter value is decremented so that the address of a destination to return to at the end of debug interrupt handling is replaced by the address of the STOP instruction. If the flag gives any other indication, the program counter value is used unchanged as the return destination address that will be in effect at the end of debug interrupt handling.

7 Claims, 4 Drawing Sheets

DEBUG INTERRUPT-HANDLING MICROCOMPUTER

BACKGROUND OF THE INVENTION

1. Field of the Invention

The present invention relates to a microcomputer using a basic clock stop instruction (called the STP instruction hereunder) to execute debug-dedicated interruption (called debug interruption hereunder) whereby a program under development (called the user program hereunder) is debugged.

2. Description of the Prior Art

Heretofore, microcomputers for which a user program was being developed were provided with an interrupt circuit including a debug interrupt request generating circuit for debugging the program in question. Debug interrupt requests were issued illustratively by an externally furnished program debugger (called the external debugger hereunder) to interrupt user program execution for debug interrupt handling.

FIG. 1 is a block diagram showing how a conventional microcomputer is connected to an external debugger. In FIG. 1, reference numeral 1 stands for a microcomputer and 2 for an external debugger. Inside the microcomputer 1, reference numeral 10 is a central processing unit (CPU); 11 is an address bus; 12 is a data bus; 13 is a control signal line; 14 is a random access memory (RAM); 15 is a program memory; 16 is an interrupt control circuit; 17 is a debug support circuit; 18 is an interrupt request signal line over which a interrupt request signal is transmitted; and 19 is a debug bus.

FIG. 2 is a block diagram depicting an internal structure of the debug support circuit 17 inside the microcomputer 1. In FIG. 2, reference numeral 20 represents a trace circuit that outputs onto the debug bus 19 the run state of the CPU 10, i.e., the status of the address bus 11, data bus 12 and control signal line 13. Reference numeral 21 denotes a register to and from which data may be written and read by the external debugger 2 and by the CPU 10 of the microcomputer 1.

The microcomputer 1 of the above constitution works as follows:

Suppose that the microcomputer 1 is executing a user program stored in the program memory 15. In that case, the external debugger 2 reads trace data from the debug support circuit 17 of the microcomputer 1 over the debug bus 19, whereby the workings of the CPU 10 in the microcomputer 1 are monitored. When the effective address of the trace data in the CPU 10 has illustratively reached a predetermined address value, the external debugger 2 outputs an interrupt request signal onto the interrupt request signal line 18. Upon receipt of the interrupt request signal, the microcomputer 1 halts temporarily the current user program execution to carry out debug interrupt handling. With debug interrupt handling initiated, the CPU 10 performs a debug handling program held in the program memory 15 and communicates with the external debugger 2 via the register 21 of the debug support circuit 17.

Illustratively, after issuing the debug interrupt request, the external debugger 2 communicates with the CPU 10 through the register 21 of the debug support circuit 17 to know the register contents in the microcomputer 1 as well as the contents of the RAM 14. Debug interrupt requests are handled in the same manner as ordinary interrupt requests. That is, on accepting an interrupt request, the CPU 10 saves the program counter value (i.e, program counter contents) indicating what should be executed next into a memory area pointed to by a stack pointer (the area is generally allocated in the RAM 14). Then interrupt handling is carried out. At the end of the handling, an interrupt return instruction (called the RTI instruction hereunder) is executed whereby the program counter value in effect at the start of the interruption is read from the memory area designated by the stack pointer for transfer to the program counter. In the manner described, the user program is first interrupted by a debug interrupt request, the request is then handled appropriately, and the temporarily halted user program execution is resumed from the instruction next to the interrupted program instruction.

Debug interruption initiated by an interrupt request signal sent from the external debugger 2 over the interrupt request signal line 18 halts user program execution temporarily for debug handling. Generally, arrangements are made so that the debug interrupt handling time per request is sufficiently short so as not to hinder user program execution. For example, where memory contents in the microcomputer 1 are to be retrieved by the external debugger 2, the address range of the memory is divided into a plurality of portions so that each pass of debug interrupt handling will involve retrieving memory contents of only several addresses and will be finished over a sufficiently short period of time.

It should be noted that even where the STP instruction is executed to stop the basic clock inside the microcomputer 1, a debug interrupt request when issued cancels the STP instruction in order to perform debug interrupt handling. This means that upon return to the user program following execution of the RTI instruction, processing is resumed from the instruction next to the STP instruction in accordance with the program counter value which was saved upon interrupt initiation and which is retrieved from the memory area pointed to by the stack pointer.

The above-mentioned conventional techniques related to microcomputers are described illustratively by JP-A Nos. Sho 58-205226, Hei 5-73349, Sho 62-95644, and Hei 1-250143.

As described, conventional microcomputers suffer from the problem of the STP instruction getting canceled by an unintended event, i.e, by debug interrupt handling while a program is being debugged. For the external debugger 2 to circumvent the above problem requires performing three steps:

(1) Disassemble the program execution address portion in effect when a debug interrupt request is accepted, and search for an STP instruction.
(2) Match analyzed trace data with the outcome of the disassembly to verify whether any STP instruction has been carried out.
(3) If the STP instruction is judged to have been executed, decrement the program counter value saved into the memory area pointed to by the stack pointer at the time of debug interrupt initiation, thereby obtaining the address at which to execute the STP instruction upon completion of the current debug interruption.

Carrying out the additional steps above prolongs the time required to perform debug interrupt handling per request.

SUMMARY OF THE INVENTION

It is therefore an object of the present invention to provide a microcomputer capable of preventing an STP instruction from being canceled by debug interruption without prolonging the time it takes to handle each debug interrupt request.

In carrying out the invention and according to one aspect thereof, there is provided a microcomputer which determines whether or not to decrement a program counter value based on a flag for indicating execution of an STP instruction. If the flag indicates that the STP instruction has been executed, the program counter value is decremented so that the address to return to at the end of debug interrupt handling is replaced by the address of the STP instruction. The inventive microcomputer thus prevents the STP instruction from getting canceled by debug interruption without prolonging the time required for debug interrupt handling per request.

In a first preferred structure according to the invention, a check is made upon completion of debug interrupt handling to see if the flag indicates execution of the STP instruction. If the flag is judged to indicate the STP instruction execution, the microcomputer decrements the program counter value using appropriate software. This structure allows a program initiating debug interruption to determine whether the address of the user program to which to return from debug interrupt handling is to be the STP instruction. This makes it possible to prevent the STP instruction from being canceled by debug interruption without prolonging the debug interrupt handling time per request.

In a second preferred structure according to the invention, when the program counter value is saved into a memory area pointed to by a stack pointer upon the issue of a debug interrupt request, a check is made to see if the flag indicates execution of the STP instruction. If the flag is judged to indicate the STP instruction execution, the microcomputer decrements the program counter value using suitable hardware. This structure allows the program counter to be decremented without the intervention of software, whereby a process to determine whether or not to return to the STP instruction following debug interrupt handling is performed faster than before.

In a third preferred structure according to the invention, when a return destination address is read from the memory area pointed to by the stack pointer and loaded into the program counter at the end of debug interrupt handling, a check is made to see if the flag indicates execution of the STP instruction. If the flag is judged to indicate the STP instruction execution, the microcomputer decrements the program counter value using suitable hardware. This structure also allows the program counter to be decremented without the intervention of software, whereby the process to determine whether or not to return to the STP instruction following debug interrupt handling is performed faster than before.

In a fourth preferred structure according to the invention, the microcomputer decrements the program counter value using a subtractor and a switch that is turned on and off by a flag. When the flag is set, the subtractor is connected by the switch to the program counter so that a predetermined value is subtracted from the program counter value. This structure permits the use of usually provided hardware of the microcomputer to achieve the stated object of the invention; no special hardware needs to be added to the standard configuration.

BRIEF DESCRIPTION OF THE DRAWINGS

Further objects and advantages of this invention will become apparent upon a reading of the following description and appended drawings in which.

DETAILED DESCRIPTION OF THE PREFERRED EMBODIMENTS

Figure 3:
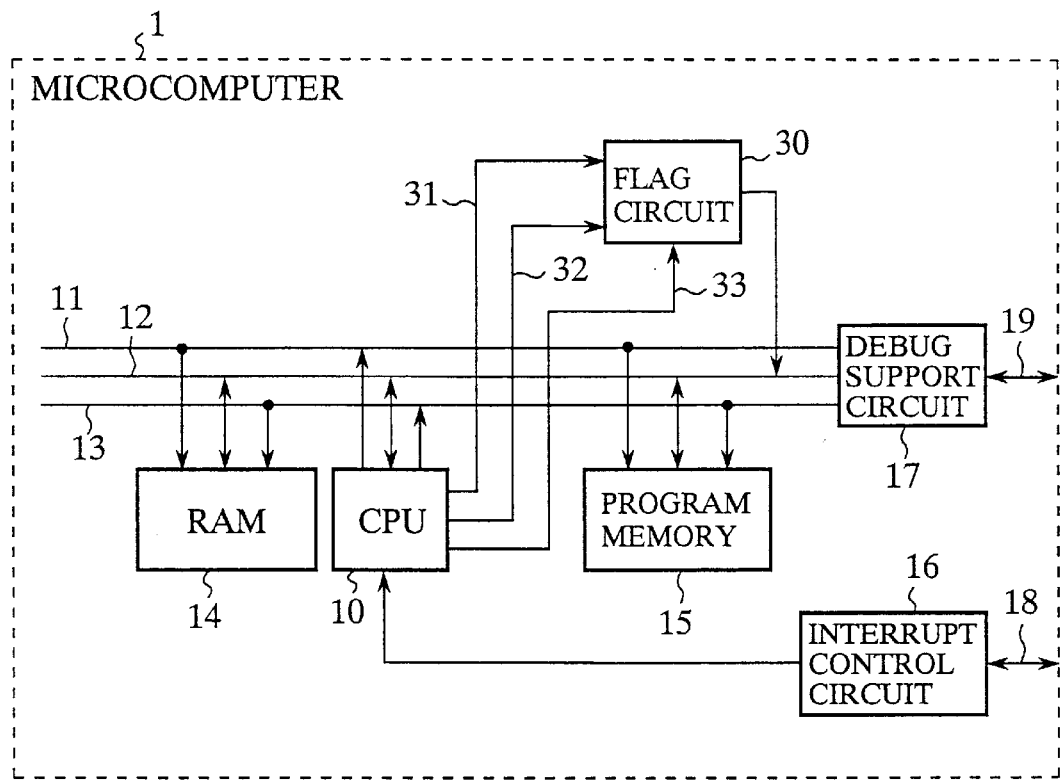
FIG. 3 is a block diagram of a microcomputer practiced as a first embodiment of the invention.

Preferred embodiments of this invention will now be described with reference to the accompanying drawings.
First Embodiment FIG. 3 is a block diagram showing a typical constitution of the microcomputer practiced as the first embodiment. In FIG. 3, reference numeral 1 represents the microcomputer. Inside the microcomputer 1, reference numeral 10 is a CPU that controls the microcomputer 1 as a whole; 11 is an address bus over which addresses are transmitted from the CPU 10; 12 is a data bus over which data are transmitted to and from the CPU 10; 13 is a control signal line over which control signals are transmitted from the CPU 10; 14 is a RAM connected to the address bus 11, data bus 12 and control signal line 13 and used as a working memory; and 15 is a program memory also connected to the address bus 11, data bus 12 and control signal line 13 and accommodating programs used by the CPU 10 for its processing.

Figure 1:
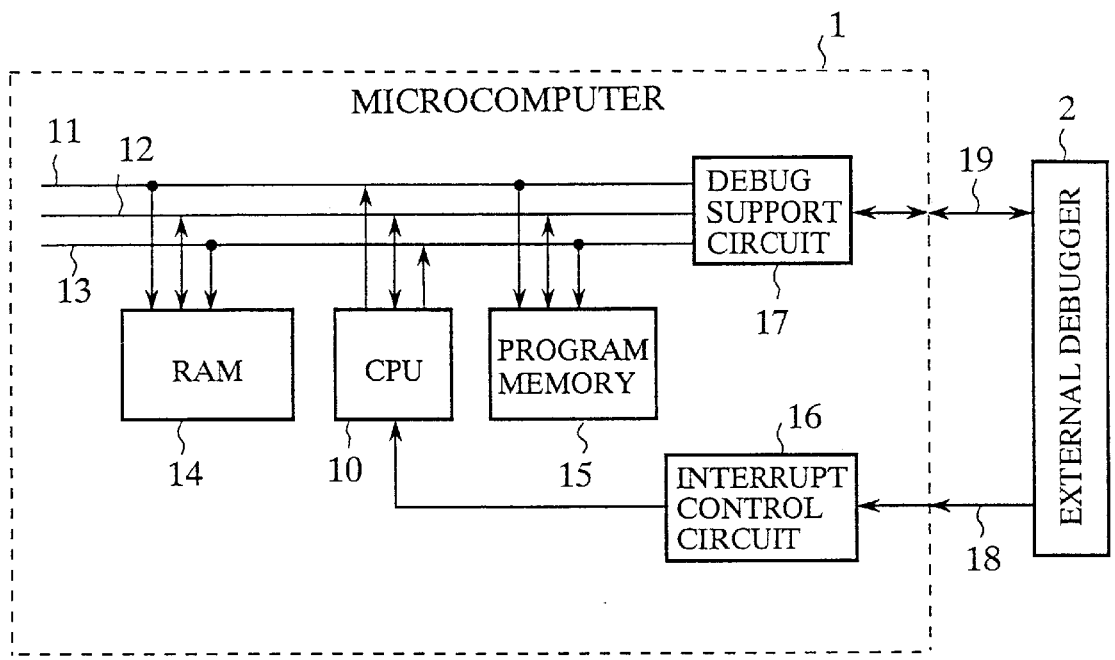
FIG. 1 is a block diagram showing how a conventional microcomputer is connected to an external debugger.
Figure 2:
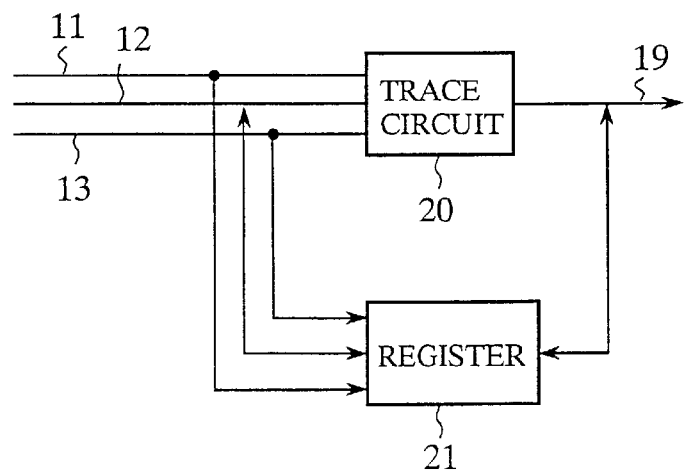
FIG. 2 is a block diagram depicting an internal structure of a debug support circuit inside the conventional microcomputer of FIG. 1.

Reference numeral 16 denotes an interrupt control circuit which receives a debug interrupt request from an externally furnished program debugger (not shown) and forwards the received request to the CPU 10, the debugger being connected to the data bus 12 and control signal line 13 and used by the CPU 10 for its processing. Reference numeral 17 represents a debug support circuit connected to the address bus 17, data bus 12 and control signal line 13 and used to exchange trace data and other data with the external debugger. Reference numeral 18 is an interrupt request signal line over which an interrupt request signal is transmitted from the external debugger to the interrupt control circuit 16; and 19 is a debug bus connecting the external debugger to the debug support circuit 17. These components correspond to their counterparts having the same reference numerals in FIG. 1.

Reference numeral 30 represents a flag circuit that stores a flag indicating execution or nonexecution of an STP instruction for stopping a basic clock inside the microcomputer 1. Reference numeral 31 is an STP execution signal line for inputting to the flag circuit 30 an STP execution signal that is outputted by the CPU 10 upon execution of an STP instruction; 32 is a flag reset signal line for inputting to the flag circuit 30 a flag reset signal that is outputted by the CPU 10 resetting the flag in the flag circuit 30 after reading that flag; and 33 is a flag read-out signal line for inputting to the flag circuit 30 a flag read-out signal outputted by the CPU 10 reading the flag from the flag circuit 30.

Figure 4:
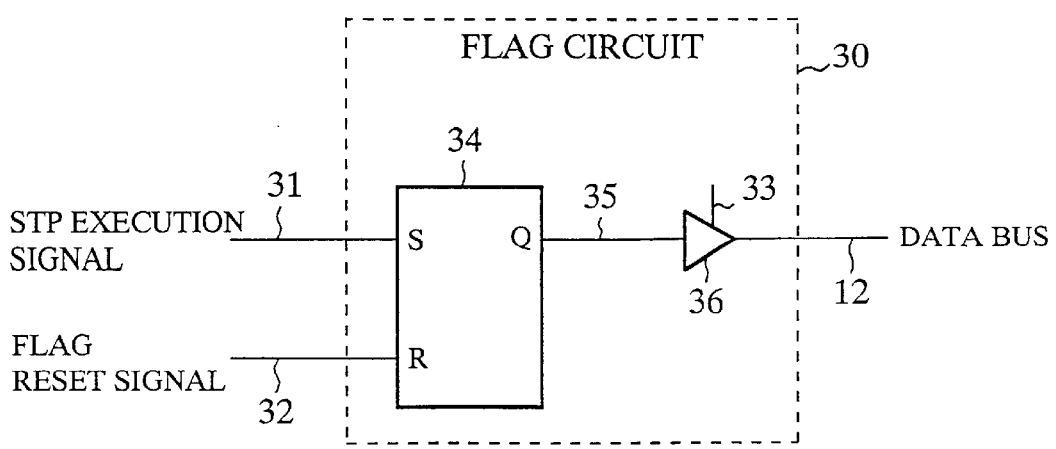
FIG. 4 is a block diagram of a flag circuit in the first embodiment.

FIG. 4 is a block diagram showing a typical constitution of the flag circuit 30. In FIG. 4, reference numeral 31 is the STP execution signal line, 32 is the flag reset signal line, and 33 is the flag read-out signal line, i.e., components that are identical to those shown in FIG. 3 with the same reference numerals. Reference numeral 34 stands for a latch circuit holding a flag which is set when an STP execution signal is inputted from the STP execution signal line 31 and reset when a flag reset signal is inputted from the flag reset signal line 32, the flag indicating execution or nonexecution of an STP instruction for stopping the basic clock inside the microcomputer 1. Reference numeral 35 is a flag output line onto which the flag held by the latch circuit 34 is outputted. Reference numeral 36 denotes a tri-state buffer which is controlled by the flag read-out signal placed by the CPU 10 onto the flag read-out signal line 33 and which forwards the flag from the flag output line 35 to the data bus 12.

How the flag circuit 30 of the above constitution works will now be described. Given an STP execution signal from the STP execution signal line 31, the flag circuit 30 has the flag set in the latch circuit 34. The CPU 10 places a flag read-out signal onto the flag read-out signal line 33, thereby reading via the data bus 12 the status of the flag held in the latch circuit 34. With the flag read out, the CPU 10 outputs a flag reset signal onto the flag reset signal line 32 to reset the flag in the latch circuit 34. Alternatively, another latch circuit may be connected to the flag read-out signal line 33. In that case, with the flag read out, the output of the additional latch circuit may be used as a flag reset signal that is placed onto the flag reset signal line 32.

Figure 5:
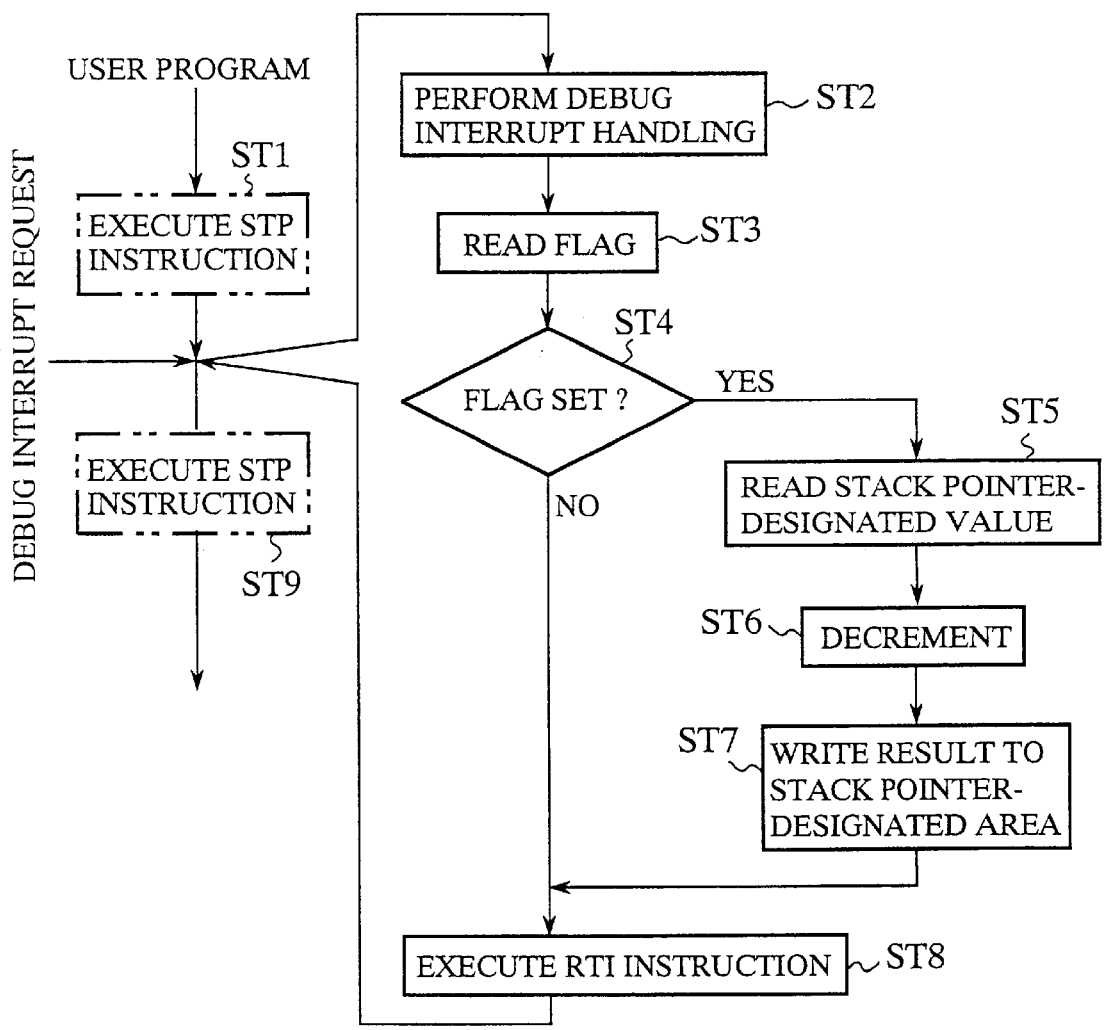
FIG. 5 is a flowchart of steps performed by the first embodiment for debug interrupt handling and user program execution.

When returning from the debug interruption to the user program with the first embodiment, a debug interrupt handling program checks the flag in the flag circuit 30 to determine whether or not to return to the STP instruction. FIG. 5 is a flowchart of steps performed by the first embodiment for debug interrupt handling and user program execution. Described below with reference to FIG. 5 is how to return to the user program from the debug interruption handling.

When an STP instruction is carried out during user program execution (step ST1), an STP execution signal from the CPU 10 sets the flag of the latch circuit 34 in the flag circuit 30. Upon receipt of a debug interrupt request from the external debugger via the interrupt request signal line 18 during user program execution, the value of the program counter in effect at that point is saved into the memory area pointed to by the stack pointer, and the debug interrupt handling is initiated (step ST2). At the end of the debug interrupt handling, the CPU 10 sends a flag read-out signal to the tri-state buffer 36 of the flag circuit 30 to read the flag held in the latch circuit 34 (step ST3). The flag allows the CPU 10 to know whether or not the user program has executed an STP instruction. The flag is checked by the debug handling program on a software basis (step ST4).

As described, the STP instruction has been carried out and the flag is set accordingly. In that case, the program counter value is read out which was saved upon debug interrupt initiation into the memory area designated by the stack pointer (step ST5). The retrieved counter value is decremented (step ST6), and the decremented value is again written to the memory area pointed to by the stack pointer (step ST7). In step ST6, the program counter value is decremented by "2" if the STP instruction is a two-word instruction and by "1" if the STP instruction is a single-word instruction.

Following execution of an RTI instruction (step ST8), the value written to the memory area indicated by the stack pointer is written to the program counter so as to return to the user program, and the STP instruction is executed (step ST9). If the flag was not found to be set, step ST4 is followed directly by step ST8 in which the RTI instruction is carried out. Thereafter, the user program is resumed in accordance with the program counter value saved upon debug interrupt initiation into the memory area pointed to by the stack pointer. These steps eliminate the possibility of the STP instruction getting canceled unintentionally at the time of debug interruption.

As described, the first embodiment of the invention allows the program that has caused debug interruption to determine on a software basis whether or not to return from debug interrupt handling to the address of the STP instruction for the user program in accordance with the flag indicating execution of the STP instruction. Thus the first embodiment constitutes a microcomputer capable of preventing the STP instruction from getting canceled by debug interruption without prolonging the debug interrupt handling time per debug interrupt request.

Second Embodiment

The first embodiment above has been shown checking the status of the flag at the end of debug interrupt handling and, if the flag is found to be set, causing the program counter value to be decremented through software processing. Alternatively, there is provided a second embodiment which checks the status of the flag when the program counter value is saved into the memory area pointed to by the stack pointer upon receipt of a debug interrupt handling request, wherein, if the flag is found to be set, the program counter value is decremented on a hardware basis. The constitution of the microcomputer practiced as the second embodiment and the structure of its flag circuit are the same as those of the first embodiment shown in FIGS. 3 and 4.

Figure 6:
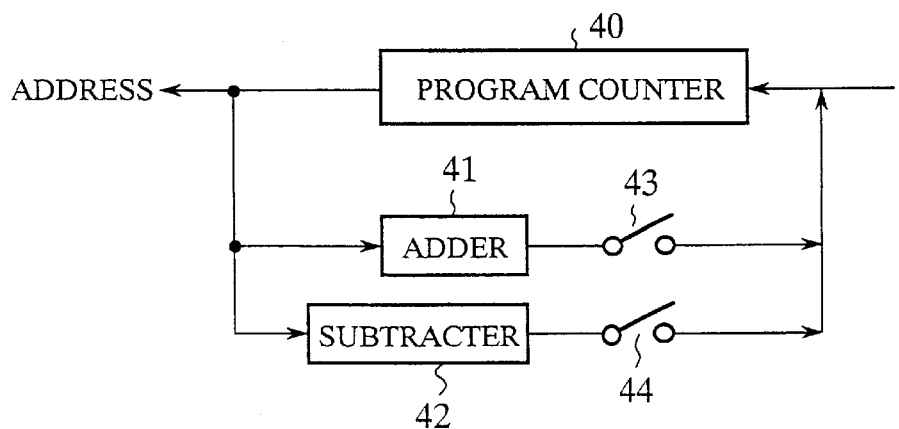
FIG. 6 is a block diagram of an address generating circuit in a microcomputer practiced as a second embodiment of the invention.

FIG. 6 is a block diagram of an address generating circuit in the microcomputer furnished as the second embodiment of the invention. In FIG. 6, reference numeral 40 is a program counter that accommodates an address in the program memory 15 of the next instruction to be executed by the CPU 10; 41 is an adder that adds "1" to the contents of the program counter 40 (i.e., program counter value); 42 is a subtractor that subtracts a predetermined value such as "2" from the contents of the program counter 40; 43 is a switch turned on or off every time the CPU 10 executes an instruction in order to increment the contents of the program counter 40; and 44 is a switch turned on or off by the flag that is outputted onto the flag output line 35. When the flag is found to be set, the switch 44 causes the subtractor to subtract a predetermined value from the contents of the program counter 40. A suitable portion of the usually furnished hardware of the microcomputer 1 doubles as the address generating circuit.

Figure 7:
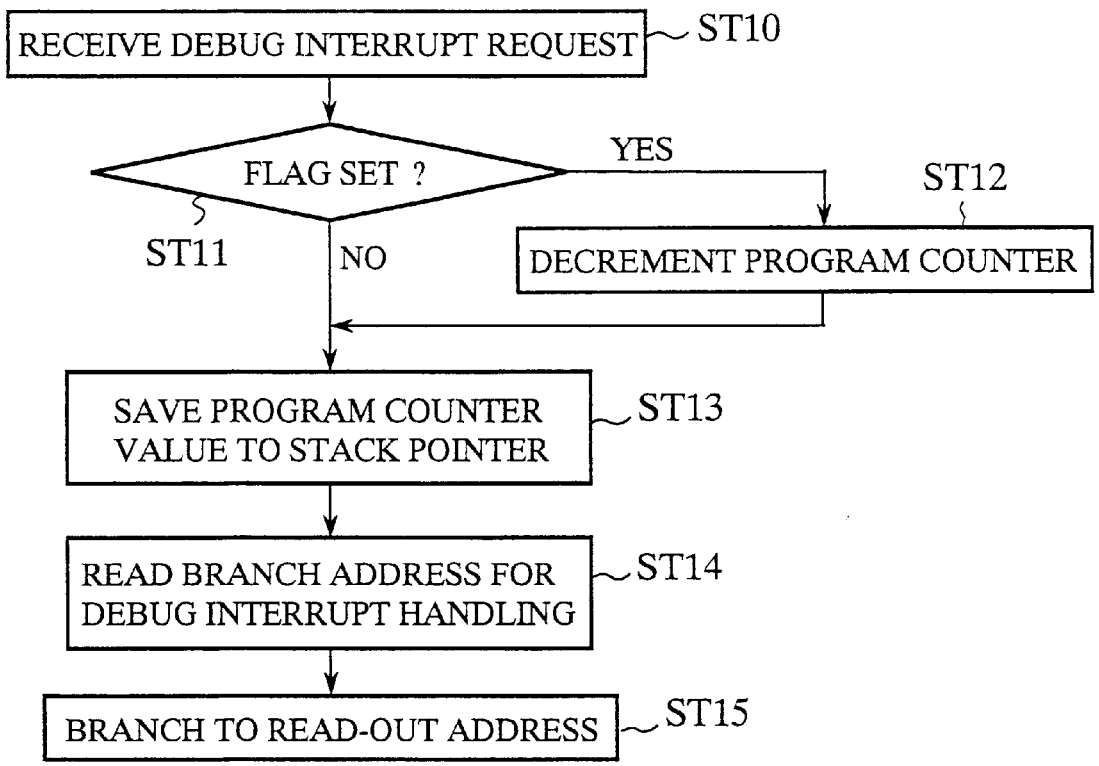
FIG. 7 is a flowchart of steps performed by the second embodiment for debug interrupt handling.

How the second embodiment works will now be described. FIG. 7 is a flowchart of steps performed by the second embodiment for debug interrupt handling. When a debug interrupt request is received (step ST10), a check is made on the flag held in the latch circuit 34 of the flag circuit 30 (step ST11). If the check shows the flag to be set, the contents of the program counter 40 are decremented by a predetermined value (step ST12). The decremented program counter value is saved into the memory area designated by the stack pointer (step ST13). More specifically, the switch 44 of the address generating circuit show in FIG. 6 is turned on or off according to the state of the flag output from the latch circuit 34 of the flag circuit 30 onto the flag output line 35. If the flag is found to be set, the switch 44 is turned on before the program counter value is saved into the memory area pointed to by the stack pointer in effect while the interrupt request is being serviced. This causes the decremented contents of the program counter 40 to be saved into the memory area designated by the stack pointer.

If the flag held by the latch circuit 34 in the flag circuit 30 is found to be reset, the switch 44 in the address generating circuit remains off. The value of the program counter 40 is not decremented. Thus the contents of the program counter 40 are saved unmodified into the memory area designated by the stack pointer. With the program counter value saved into the stack pointer-designated memory area, a branch address for debug interrupt handling is read out (step ST14). A branch is made to the address thus retrieved (step ST15), and debug interrupt handling is carried out.

In the description above, the address generating circuit has been shown comprising the program counter 40, adder 41, subtractor 42, and switches 43 and 44, i.e., components that are usually furnished in the microcomputer 1. Alternatively, a dedicated circuit may be provided to subtract a predetermined value from the program counter contents. The subtraction may be implemented with relative ease by use of a micro-code arrangement for controlling interrupt sequence. In like manner, the flag may be reset by switching on a flag reset signal over the flag reset signal line 32 after the interrupt request is serviced.

Upon receipt of a debug interrupt handling request, as described, the second embodiment checks the status of the flag when the program counter value is saved into the memory area designated by the stack pointer. If the flag is found to be set, the program counter value is decremented on a hardware basis. That is, no intervention of software is needed for decrementing the contents of the program counter. This allows the second embodiment to act faster than the first embodiment in determining whether or not to return to the STP instruction at the end of debug interrupt handling. Another benefit is that no additional hardware is needed because the program counter value is decremented by usually furnished hardware parts of the microcomputer, i.e., a subtractor and a switch that connects the subtractor to the program counter when the flag is found to be set.

Third Embodiment

The second embodiment has been shown checking, given a debug interrupt handling request, the status of the flag when the program counter value is saved into the memory area designated by the stack pointer. If the flag is found to be set, the program counter value is decremented on a hardware basis. The third embodiment of the invention, on the other hand, checks the status of a flag at the end of debug interrupt handling when a return destination address is read from the memory area pointed to by the stack pointer and loaded into the program counter. When the flag is found to be set, the program counter value is decremented on a hardware basis.

The constitution of the microcomputer practiced as the third embodiment and the structures of its flag circuit and address generating circuit are the same as those of the first and second embodiments shown in FIGS. 3, 4 and 6. Set, reset and read operations on the flag by the third embodiment are performed in the same manner as by the first embodiment. Below is a description of operations specifically characteristic of the third embodiment.

Figure 8:
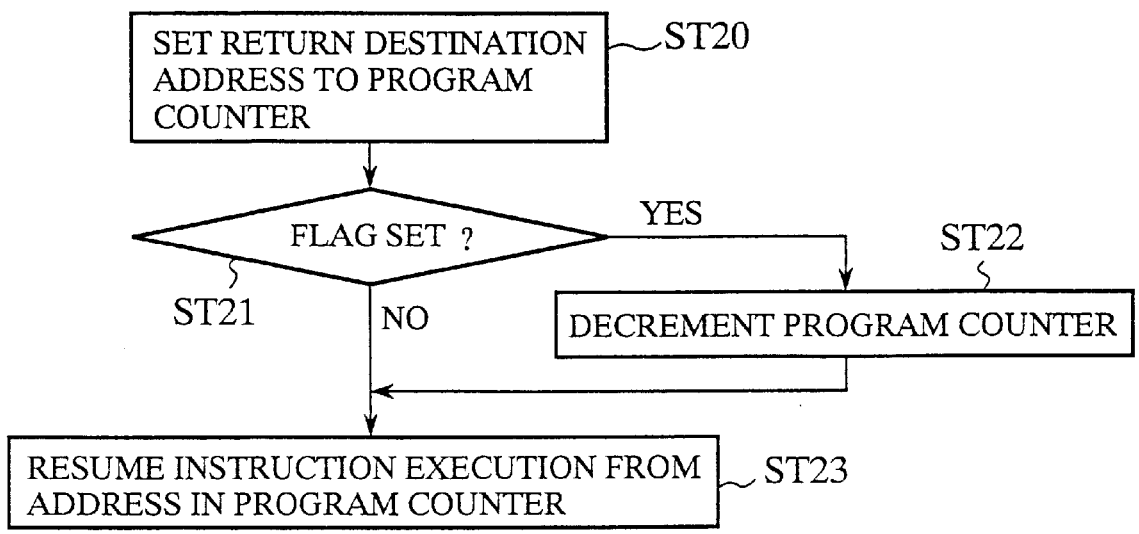
FIG. 8 is a flowchart of steps performed by a microcomputer executing an RTI instruction, the microcomputer being practiced as a third embodiment of the invention.

FIG. 8 is a flowchart of steps performed by the third embodiment executing an RTI instruction for a return from debug interrupt handling to the user program. At the end of debug interrupt handling, a return destination address saved in the memory area designated by the stack pointer is brought to the program counter 40 (step ST20). With the address loaded into the counter 40, an STP instruction flag is judged (step ST21). If the flag is found to be set, the switch 44 in the address generating circuit is turned on to connect the subtractor 42 to the program counter 40 so that the counter value will be decremented (step ST22). The value of the program counter 44, i.e., the return destination address set in step ST20, is decremented by a predetermined value. If the flag is not found to be set, step ST22 is bypassed; in the program counter 40 remains unchanged the return destination address that was saved in the memory area pointed to by the stack pointer.

The contents of the program counter 40 are regarded as the return destination address for a return to the user program, and instruction execution is resumed from that address (step ST23). That is, if the STP instruction has been carried out and the flag is set, the STP instruction of the user program is resumed; if the STP instruction has not been performed and the flag is not set, a return is effected to the instruction of the return destination address saved in the stack pointer-designated memory area upon receipt of the debug interrupt handling request.

As described, the third embodiment has been shown checking the status of the flag at the end of debug interrupt handling when the return destination address is read from the memory area pointed to by the stack pointer and loaded into the program counter. When the flag is found to be set, the program counter value is decremented on a hardware basis. Because the program counter value is decremented without the intervention of software, the third embodiment operates as fast as the second embodiment in determining whether or not to return to the STP instruction at the end of debug interrupt handling.

As many apparently different embodiments of this invention may be made without departing from the spirit and scope thereof, it is to be understood that the invention is not limited to the specific embodiments thereof except as defined in the appended claims.

What is claimed is:

1. A microcomputer comprising:
    a program counter for computing a count of program execution;
    a memory for temporarily storing the count of said program counter;
    basic clock stop instruction generating means for generating a clock stop instruction causing an internal basic clock to stop;
    interrupt handling executing means for executing interrupt handling dedicated to program debugging;
    address designating means for designating a return destination address for program processing to return to at the end of interrupt handling executed by said interrupt handling executing means;
    latching means for latching a flag indicating that said clock stop instruction is generated by said basic clock stop instruction generating means; and
    subtracting means for subtracting a predetermined value from the count of said program counter when said flag is latched by said latching means;
    wherein said address designating means designates as said return destination address an address count of said program counter obtained after the subtraction therefrom by said subtracting means if said flag is latched by said latching means, said address designating means further designating as said return destination address the count of said program counter not undergoing subtraction by said subtracting means if said flag is not latched by said latching means.

2. A microcomputer according to claim 1, further comprising judging means for judging whether said flag is latched by said latching means, wherein said judging means makes the judgment immediately after said interrupt handling executing means has executed said interrupt handling.

3. A microcomputer according to claim 1, further comprising judging means for judging whether said flag is latched by said latching means, wherein said judging means makes the judgment when the count of said program counter is saved into that area in said memory which is designated by a stack pointer in response to a request generated to invoke said interrupt handling.

4. A microcomputer according to claim 1, further comprising judging means for judging whether said flag is latched by said latching means, wherein said judging means makes the judgment when a return destination address is read from that area in said memory which is designated by a stack pointer and loaded into said program counter at the end of said interrupt handling executed by said interrupt handling executing means.

5. A microcomputer according to claim 1, wherein the subtraction of said subtracting means is carried out by software arrangements.

6. A microcomputer according to claim 1, wherein the subtraction of said subtracting means is carried out by hardware arrangements.

7. A microcomputer according to claim 6, wherein said hardware arrangements include:
   a subtractor for subtracting a predetermined value from the count of said program counter; and
   a switch turned on and off depending on status of said flag, said switch being turned on when said flag indicates execution of said basic clock stop instruction, the activated switch connecting said subtractor to said program counter so that said predetermined value will be subtracted from the count of said program counter.

* * * * *